United States Patent
Eigen et al.

(10) Patent No.: US 11,417,130 B2
(45) Date of Patent: *Aug. 16, 2022

(54) SYSTEM AND METHOD FOR FACILITATING GRAPHIC-RECOGNITION TRAINING OF A RECOGNITION MODEL

(71) Applicant: Clarifai, Inc., New York, NY (US)

(72) Inventors: David Joshua Eigen, New York, NY (US); Matthew Zeiler, New York, NY (US)

(73) Assignee: Clarifai, Inc., New York, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 16/998,384

(22) Filed: Aug. 20, 2020

(65) Prior Publication Data

US 2020/0380319 A1 Dec. 3, 2020

Related U.S. Application Data

(63) Continuation of application No. 16/214,636, filed on Dec. 10, 2018, now Pat. No. 10,776,675, which is a (Continued)

(51) Int. Cl.
*G06V 30/194* (2022.01)
*G06T 11/60* (2006.01)
(Continued)

(52) U.S. Cl.
CPC ......... *G06V 30/194* (2022.01); *G06K 9/6255* (2013.01); *G06K 9/6262* (2013.01);
(Continued)

(58) Field of Classification Search
CPC .. G06V 30/194; G06V 2201/09; G06V 10/82; G06K 9/6255; G06K 9/6262;
(Continued)

(56) References Cited

U.S. PATENT DOCUMENTS 10,007,863 B1 6/2018 Pereira
10,163,043 B2 * 12/2018 Eigen ..................... G06V 10/82
(Continued)

OTHER PUBLICATIONS

Huang et al., "Vehicle Logo Recognition System Based on Convolutional Neural Networks with a Pretraining Strategy." IEEE Transactions of Intelligent Transportation Systems, vol. 16, No. 4, Aug. 2015, pp. 1951-1960.
(Continued)

*Primary Examiner* — Jon Chang
(74) *Attorney, Agent, or Firm* — Buckley, Maschoff & Talwalkar LLC

(57) ABSTRACT

In certain embodiments, training of a prediction model (e.g., recognition or other prediction model) may be facilitated via a training set based on one or more logos or other graphics. In some embodiments, graphics information associated with a logo or graphic (e.g., to be recognized via a recognition model) may be obtained. Media items (e.g., images, videos, etc.) may be generated based on the graphics information, where each of the media items includes (i) content other than the logo and (ii) a given representation of the logo integrated with the other content. In some embodiments, the media items may be processed via the recognition model to generate predictions (related to recognition of the logo or graphic for the media items). The recognition model may be updated based on (i) the generated predictions and (ii) corresponding reference indications (related to recognition of the logo for the media items).

20 Claims, 4 Drawing Sheets

Related U.S. Application Data continuation of application No. 15/475,900, filed on Mar. 31, 2017, now Pat. No. 10,163,043.

(51) Int. Cl.
  *G06K 9/62* (2022.01)
  *G06V 10/82* (2022.01)
  *G06T 7/33* (2017.01)
  *G06T 5/00* (2006.01)

(52) U.S. Cl.
  CPC .......... *G06K 9/6273* (2013.01); *G06T 5/001* (2013.01); *G06T 7/337* (2017.01); *G06T 11/60* (2013.01); *G06V 10/82* (2022.01); *G06T 2207/20081* (2013.01); *G06T 2207/20084* (2013.01); *G06V 2201/09* (2022.01)

(58) Field of Classification Search
  CPC ....... G06K 9/6273; G06T 5/001; G06T 7/337; G06T 11/60; G06T 2207/20081; G06T 2207/20084
  See application file for complete search history.

(56) References Cited

U.S. PATENT DOCUMENTS

| | | | |
|---|---|---|---|
| 10,776,675 B2* | 9/2020 | Eigen | G06T 5/001 |
| 2009/0297007 A1* | 12/2009 | Cosatto | G06T 7/0012 |
| | | | 382/131 |
| 2016/0358024 A1 | 12/2016 | Krishnakumar et al. | |
| 2017/0116498 A1 | 4/2017 | Raveane et al. | |
| 2017/0140236 A1 | 5/2017 | Price | |
| 2017/0304732 A1 | 10/2017 | Velic et al. | |
| 2018/0082106 A1* | 3/2018 | Inaba | G06K 9/6256 |
| 2019/0156202 A1 | 5/2019 | Falk | |
| 2021/0224990 A1* | 7/2021 | Varekamp | G06T 7/11 |

OTHER PUBLICATIONS

Notice of Allowance dated Sep. 4, 2018, in related U.S. Appl. No. 15/475,900, 8 pages.

Office Action dated May 10, 2018, in related U.S. Appl. No. 15/475,900, 18 pages.

Notice of Allowance dated May 14, 2020, in related U.S. Appl. No. 16/214,636, 9 pages.

* cited by examiner

SYSTEM AND METHOD FOR FACILITATING GRAPHIC-RECOGNITION TRAINING OF A RECOGNITION MODEL

CROSS-REFERENCE TO RELATED APPLICATIONS

The present patent application is a continuation of U.S. patent application Ser. No. 16/214,636, filed on Dec. 10, 2018 which was issued on Sep. 15, 2020 as U.S. Pat. No. 10,776,675, and which is a continuation of U.S. patent application Ser. No. 15/475,900, filed on Mar. 31, 2017, which was issued on Dec. 25, 2018 as U.S. Pat. No. 10,163,043 the entire contents of which are incorporated herein by reference.

FIELD OF THE INVENTION

The invention relates to training of prediction models, including, for example, training of a neutral network or other recognition model to recognize a logo or other object.

BACKGROUND OF THE INVENTION

In recent years, the field of artificial intelligence and machine learning has experienced a resurgence due to advances in performance of computer hardware, sizes of training sets, theoretical understanding of artificial intelligence, and other advances. This resurgence has enabled many advances in other technical fields, including recognition or other prediction systems. One application of automated recognition systems include detection of brand logos in images and videos shared on social media or other platforms, which may be used to develop insights into the brands, including interest of users with respect to the brands and their products/services, the types of users that like (or dislike) particular brands, or other information.

In typical artificial-intelligence-based recognition systems, a recognition model is trained to recognize logos of different appearances by collecting and hand-annotating large sets of images in which the logos appear in many different settings (e.g., photographs, ads, etc.) from many different views (e.g., left-perspective billboard, front-perspective on a T-shirt, etc.) in order to encompass a wide enough variety of appearance to obtain acceptable performance. Even with computer-assisted searches, the collection of the large sets of images (in which a given logo appears) for use in training a recognition model to recognize the given logo can be resource intensive and time consuming. Moreover, a collection of large sets of images (in which a given logo appears) may be difficult or impossible to obtain via computer-assisted searches, especially when the given logo is new and has not (or has only recently) been released to the public. These and other drawbacks exist.

SUMMARY OF THE INVENTION

Aspects of the invention relate to methods, apparatuses, and/or systems for facilitating training of a neutral network or other recognition model to recognize a logo (or other graphic) or other object.

In some embodiments, logo recognition training of a recognition model may be facilitated via a media item training set generated based on one or more logos. The media item training set may include images, videos, audios, or other media items. A neutral network or other recognition model may be trained and utilized for recognizing logos. In some embodiments, in addition to, or instead of, collecting large sets of already-existing media items having representation of the logos and hand-annotating those media items to prepare them for use in training the recognition model, a small number of representations of the logos may be used to generate a large set of media items for training the recognition model to recognize the logos. In some embodiments, a large set of training media items may be generated from a small set of representations of a logo by automatically applying different transformations to a representation of the logo and combining the transformed representations of the logo respectively with other content. In some embodiments, the same transformed representation of the logo may be used to generate multiple training media items. In this way, for example, the need to perform resource-intensive and/or time-consuming computer-assisted searches to collect large sets of images for use in training a recognition model to recognize a given logo or other graphic may be reduced. Even in circumstances where large sets of already-existing media items having a representation of a specific logo may be difficult or impossible to obtain, a sufficient collection of media items may be generated to efficient train a recognition model.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
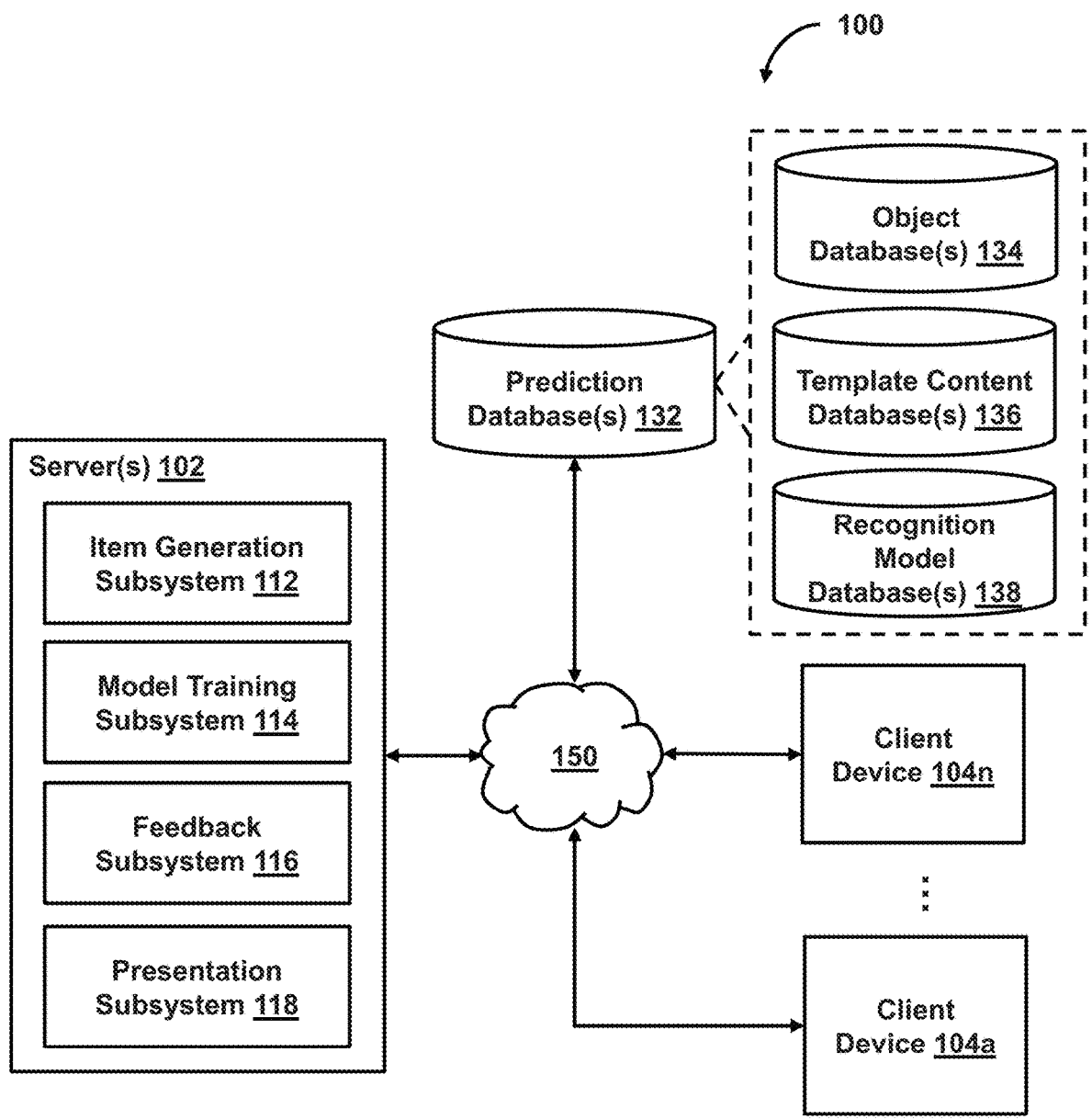
FIG. 1 shows a system for facilitating training of recognition or other prediction models, in accordance with one or more embodiments.
Figure 2A:
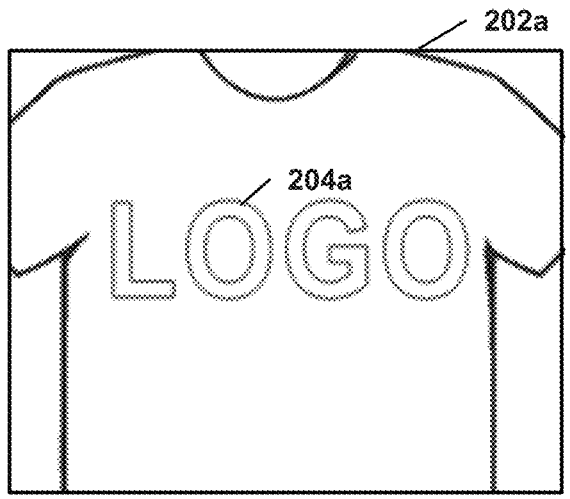
FIGS. 2A-2F illustrate training images generated from a rendering of a logo, in accordance with one or more embodiments.
Figure 2B:
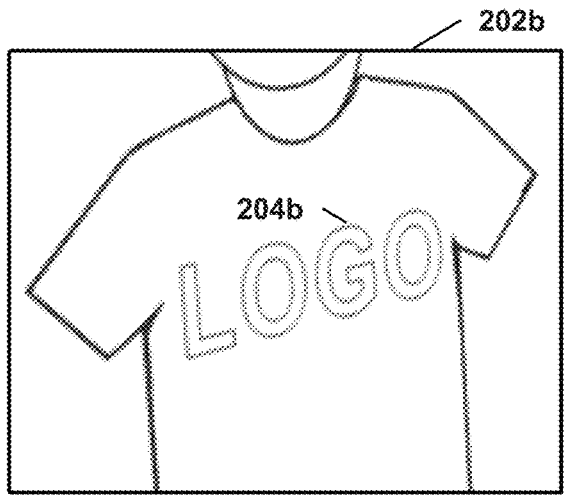
Figure 2C:
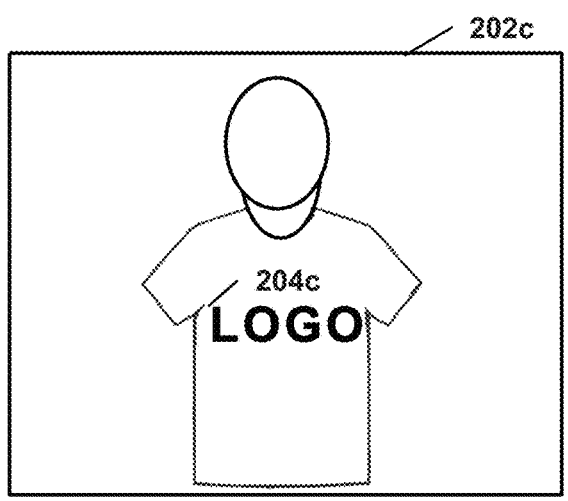
Figure 2D:
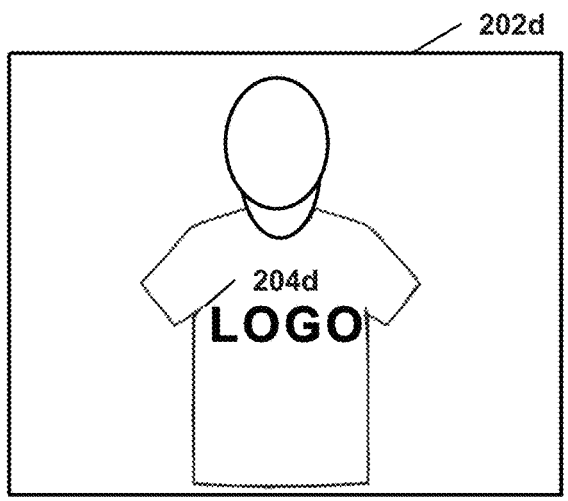
Figure 2E:
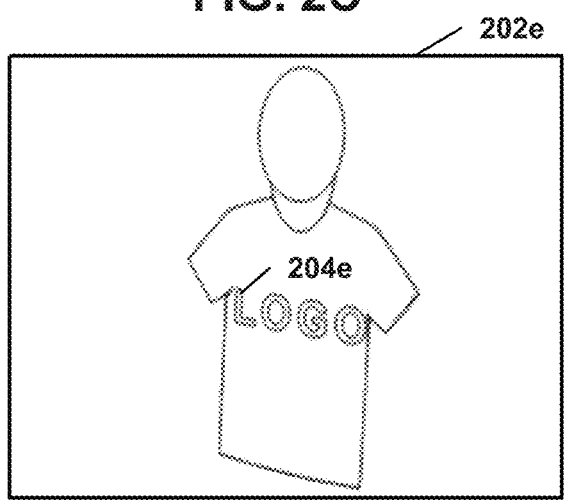
Figure 2F:
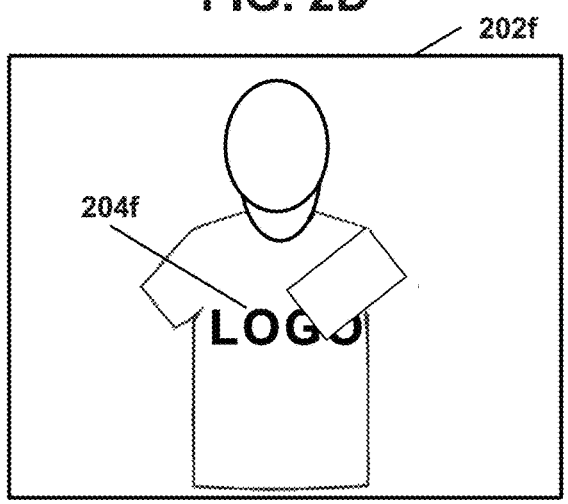

FIG. 1 shows a system 100 for facilitating training of recognition or other prediction models, in accordance with one or more embodiments. As shown in FIG. 1, system 100 may include server(s) 102, client device 104 (or client devices 104a-104n), or other components. Server 102 may include item generation subsystem 112, model training subsystem 114, feedback subsystem 116, presentation subsystem 118, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of client device 104.

As discussed, training a recognition model (or other prediction model) can be a challenge. While advances in the performance of computer hardware have greatly increased the capabilities of servers and networks to obtain and process data and also lowered the cost to do so, computer-assisted searches to collect large sets of images (in which a given object appears) for use in training a recognition model to recognize the object can be resource intensive and time consuming. A collection of large sets of images (in which a given object appears) may also be difficult or impossible to obtain via computer-assisted searches. As an example, it may be difficult or impossible to obtain large sets of images showing a new logo when the new logo has not been or only recently released to the public. As another example, it may be difficult to obtain larger sets of images showing a particular individual when the individual has generally avoided having his/her picture taken or when the individual avoids social media.

Training Item Generation and Model Training

In some embodiments, system 100 may facilitate object recognition training of a recognition model via a media item training set generated based on one or more objects. Such objects may include logos (or other graphics), persons, animals (e.g., non-human animals), plants, physical items, fictional characters or objects, or other objects that are to be recognized via a recognition model (e.g., a neutral network or other recognition model). The media item training set may include images, videos, audios, or other media items. In some embodiments, a neutral network may be trained and utilized for recognizing objects. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neutral unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, system 100 may facilitate training of a recognition model to recognize one or more objects. In addition to, or instead of collecting large sets of already-existing media items having representation of the objects and hand-annotating those media items to prepare them for use in training the recognition model, a small number of representations of the objects may be used to generate a large set of media items for training the recognition model to recognize the objects. As an example, with respect to a logo (that is to be recognized by the recognition model), a single "template" image of the logo (or other small number of template images of the logo) in raster or vector format (or other format) may be used to generate training media items that each include a rendering of the logo. In one use case, the template image(s) of the logo may only include the logo on a "clean" background (e.g., transparent background, solid white background, etc.). In another use case, other types of template image(s) of the logo may be utilized to generate the training media items. The number of template images of the logo utilized to generate the training media item may be 10 or less template images of the logo, 20 or less template images of the logo, 30 or less template images of the logo, or other number of template images. The number of training media items (generated based on the template images of the logo) may be 500 or more training media items, 1000 or more training media items, 10000 or more training media items, 100000 or more training media items, 1000000 or more training media items, or other number of training media items.

In some embodiments, system 100 may use object information associated with an object (e.g., from object database(s) 134 or other source) to generate media items for training a recognition model (e.g., a neural network or the recognition model) to recognize the object. System 100 may provide the media items as input to the recognition model to train the recognition model to recognize the object (e.g., as described herein). The object information may include a data file or other data structure having data representing a representation of the object (e.g., a rendering of the object or other representation of the object), a data file or other data structure having data identifying a reference to the representation of the object (e.g., a link or other pointer to the representation of the object), or other information. In some embodiments, each of the training media items (generated based on the object information) may include a rendering of the logo. In some embodiments, each of the training media items may include (i) content other than the logo and (ii) the logo integrated with the other content. As an example, the other content may include representations of other objects (e.g., logos, persons, animals (e.g., non-human animals), plants, physical items, fictional characters or objects, etc.), background or foreground content, watermarks, randomly-generated content, or other aspects.

In some embodiments, with respect to training a recognition model to recognize an object, system 100 may generate a large set of training media item from a small set of representations of the object by automatically applying different transformations to a representation of the object (e.g., a rendering or other representation of the object) and combining the transformed representations of the object respectively with other content (e.g., background images, representations of other objects, randomly-generated patterns or content, etc.). In some embodiments, the same transformed representation of the object may be used to generate multiple training media items (e.g., the same transformed representation of the object combined with different background images, different representations of other objects, different randomly-generated patterns or content, etc.). In some embodiments, the automatic application of the different transformations may include randomized transformations to a representation of the object. In some embodiments, the randomized transformation may be a pseudo-randomized transformation (e.g., by executing one or more RdRand instructions and applying one or more seed values or via other randomization techniques). In this way, for example, the need to perform resource-intensive and/or time-consuming computer-assisted searches to collect large sets of images for use in training a recognition model to recognize a given object may be reduced. As another example, even in circumstances where large sets of already-existing media items having a representation of a specific object may be difficult or impossible to obtain, system 100 may enable media items to be obtained (e.g., automatically generated) to train a recognition model. In some embodiments, media items generated by system 100 for training a recognition model may be tuned to resemble those that would typically be found in one or more application settings (e.g., different photographs, advertisements, etc.).

In some embodiments, item generation subsystem 112 may generate media items based on object information associated with an object (e.g., a rendering or other representation of the object) or other information such that the media items respectively include representations of the object or other content with which the object is integrated. As an example, FIGS. 2A-2F illustrate media items (e.g., images) generated from a representation of an object (e.g., a logo). In one use case, with respect to FIGS. 2A-2F, a data file of the logo (e.g., a file representing a rendering of the logo) may be used to generate images 202a-202f for use in training a recognition such that each of images 202a-202f include a logo rendering 204 (e.g., logo rendering 204a-204f). In another use case, each of the logo renderings 204a-204f may be integrated with one or more background images (e.g., different images of a person wearing a t-shirt without the logo) to generate new images (e.g., images of a person wearing a t-shirt with the logo) for use in training a recognition model to recognize the logo.

In some embodiments, item generation subsystem 112 may obtain one or more transformation parameter sets (e.g., from template content database(s) 136 or other source) and generate media items based on (i) object information associated with an object, (ii) the transformation parameter sets, or (iii) other information. Model training subsystem 114 may process, via a recognition model, the generated media items to train the recognition model to recognize the object. In some embodiments, each of the transformation parameter sets includes parameters different from one or more other ones of the transformation parameter sets and/or parameters that are the same as parameters of one or more other ones of the transformation parameter sets. The transformation parameter sets may include sharpening parameters (e.g., for adjusting sharpness of object representation or other content), softening parameters (e.g., for adjusting softness of object representation or other content), brightness parameters (e.g., for adjusting brightness of object representation or other content), contrast parameters (e.g., for adjusting contrast of object representation or other content), recoloring parameters (e.g., for recoloring an object representation or other content), or other transformation parameters.

Additionally, or alternatively, the transformation parameter sets may include blurring effect parameters (e.g., for adding blurring effects to an object representation or other content), camera effect parameters (e.g., for adding camera effects to an object representation or other content), motion effect parameters (e.g., for adding motion effects to an object representation or other content), shadow effect parameters (e.g., for adding shadow effects to an object representation or other content), pattern effect parameters (e.g., for adding pattern effects to an object representation or other content), texture effect parameters (e.g., for adding texture effects to an object representation or other content), or other transformation parameters. As an example, camera effects may include matte painting, Schüfftan process, forced perspective, dolly zoom, lens flares, lighting effects, filtration (e.g., using a fog filter to simulate fog, a grad filter to simulate sunset, etc.), shutter effects, time-lapse, slow motion, fast motion, speed ramping, bipacks, slit-scan, infrared photography, reverse motion, front projection, rear projection, phonotrope, or other camera effects. In one scenario, with respect to FIG. 2D, shadow effect parameters indicating adding a shadow effect to a particular rendering of a logo (e.g., rendering 204a or 204c) may have been applied to the particular logo rendering to generate logo rendering 204d.

Additionally, or alternatively, the transformation parameter sets may include rotation parameters (e.g., for rotating an object representation or other content), perspective parameters (e.g., for adjusting a perspective view of an object representation or other content), resizing parameters (e.g., for resizing an object representation or other content to simulate effects of scale), compression parameters (e.g., for compressing a data tile or other structure representing an object representation or other content to reduce file/structure size), deletion parameters (e.g., for removing from view a portion of an object representation or other content), occlusion parameters (e.g., for making transparent or hiding a portion of an object representation or other content), or other transformation parameters.

In one use case, resizing parameters indicating adjusting a size of a particular rendering of a logo (e.g., rendering 204c) may have been applied to the particular logo rendering to generate logo rendering 204a. In another use case, with respect to FIGS. 2B and 2E, different rotation parameters indicating rotating of a particular rendering of a logo (e.g., rendering 204a or 204c) may have been applied to the particular logo rendering to respectively generate logo renderings 204b and 204e. In a further use case, different perspective parameters indicating adjustment of a perspective of a particular rendering of a logo (e.g., rendering 204a or 204c) may have been applied to the particular logo rendering to respectively generate logo renderings 204b and 204e. In another use case, with respect to FIG. 2F, one or more deletion or occlusion parameters indicating removal or hiding of a portion of a particular rendering of a logo (e.g., rendering 204a or 204c) may have been applied to the particular logo rendering to generate logo rendering 204f (e.g., where portions of the "G" and the second "O" are removed or hidden). Such transformations of a single representation of an object (or small number of representations of the object) may, for example, allow system 100 to generate a large set of object representations (e.g., 100 or more, 500 or more, 1000 or more, 10000 or more, 100000 or more, 1000000 or more, etc.) and/or combine at least some of those object representations with other content to generate one or more large sets of media items (e.g., 500 or more, 1000 or more, 10000 or more, 100000 or more, 1000000 or more, 10000000 or more, etc.).

In some embodiments, item generation subsystem 112 may obtain one or more transformation parameter sets by randomly generating the transformation parameter sets, and item generation subsystem 112 may generate media items based on (i) object information associated with an object, (ii) the transformation parameter sets, or (iii) other information. In some embodiments, item generation subsystem 112 may randomly generate the transformation parameter sets by randomly obtaining transformation parameters for each of the transformation parameter sets (e.g., via random generation of transformation parameters for each of the transformation parameter sets, via random selection of the transformation parameters for each of the transformation parameter sets from a larger set of transformation parameters, etc.). In some embodiments, the randomization may be pseudorandom (e.g., by executing one or more RdRand instructions and applying one or more seed values or via other randomization techniques to randomly obtain the transformation parameters).

In some embodiments, item generation subsystem 112 may obtain template media items (e.g., from template content database(s) 136 or other source) and generate media items (for use in training a recognition model to recognize an object) by integrating representations of the object with the template media items. Such template media items may include images, videos, audios, or other media items. As an example, one or more representations of the object may be transformed (e.g., as described herein) to generate transformations of those object representations. For each of a plurality of template media items, item generation subsystem 112 may generate one or more training media items by integrating one or more transformed representations (or untransformed representations) with the template media item. In some embodiments, integration of one or more representations of an object (e.g., untransformed or transformed object representations) with a template media item may comprise (i) alpha-blending the object representations with the template image, (ii) inserting multiple copies or multiple different ones of the object representations on the template image (e.g., such that a media item generated from the multiple insertions includes multiple representations of the object), or (iii) performing other integration techniques.

Model Training Via Reference Feedback

In some embodiments, upon obtaining a set of media items (e.g., via techniques as described herein) for training a recognition model (e.g., a neural network or other recognition model) to recognize one or more objects, system 100 may process the media items via the recognition model to generate predictions related to recognition of the objects with respect to the processed media items (e.g., how the recognition believes the objects should be labeled, where the recognition model believes the objects are located within the media items, or other predictions). System 100 may analyze those predictions against a set of reference feedback, such as reference labels describing the objects to be recognized respectively in one or more of the processed media items, reference indications of locations of the objects to be recognized respectively in the processed media items, or other desired outputs for use as a reference. In one use case, the reference outputs may be provided as input to the recognition model (e.g., prior to, simultaneously with, or subsequent to providing the training media items to the recognition model), which the recognition model may utilize to determine whether its predictions are accurate, determine the level of accuracy or completeness with respect to each prediction, or other make other determinations (e.g., via deep learning through its multiple layers of abstraction or other techniques). Such determinations may be utilized by the recognition model to improve the accuracy or completeness of its object recognition capabilities. In another use case, accuracy or completeness indications with respect to the recognition model's predicted labels, predicted location indications, or other predictions (e.g., whether a given prediction is accurate, how accurate or complete a given prediction is, etc.) may be provided to the recognition model, which, in turn, may utilize the accuracy or completeness indications to improve the accuracy or completeness of its object recognition capabilities.

In some embodiments, model training subsystem 114 may provide a set of media items (that include one or more objects to be recognized) as input to a recognition model, which, in turn, may output its predicted class labels, bounding boxes, heat maps, or other predictions with respect to the objects or other aspects of the media items. In some embodiments, model training subsystem 114 may train the recognition model by constraining the training media items to a limited receptive field (e.g., in which the object(s) to be recognized makes up a significant or majority portion of the training media items). Additionally, or alternatively, model training subsystem 114 may train the recognition model at multiple scales (e.g., training media items having different sizes of the same object or having representations of the object at different locations within the training media items) to help the recognition model recognize logos at different positions and sizes. In some cases, each training iteration may increase the number of different sizes or positions of the representation of the object (e.g., up to a threshold number of iterations or other bound). In some cases, each training iteration may decrease the number of different sizes or positions of the representations of the object (e.g., up to a threshold number of iterations or other bound).

In some embodiments, prior to, simultaneously with, or subsequent to providing a set of media items to a recognition model for processing, feedback subsystem 116 may provide the recognition model with reference labels describing one or more object to be recognized in one or more of the processed media items, reference indications of locations of the objects to be recognized in the processed media items, or other desired outputs for use as a reference. As indicated, the generated predictions may include labels of the objects respectively predicted to be in the processed media items (e.g., class labels or other labels describing the predicted objects), indications of predicted locations of the predicted objects (e.g., heat or other maps, boundary boxes or other structures, etc., indicating the predicted locations), or other predictions. As indicated, the recognition model may utilize such reference outputs to improve the accuracy or completeness of its object recognition capabilities.

In some embodiments, presentation subsystem 118 may cause one or more predictions of a recognition model to be presented on a user interface to obtain user feedback. Feedback subsystem 116 may obtain user feedback with respect to a prediction (e.g., a binary feedback indicating accurate or not accurate, a user input identifying a label of an object, a user input identifying a location of the object, or other feedback) and provide the user feedback to the recognition model. In response, the recognition may utilize the user feedback to update itself to acknowledge or reflect the user feedback. In one scenario, the user feedback may include "Correct" or "Not Correct" with respect to the recognition model's prediction of a label for an object predicted to be in a processed media item. In another scenario, the user feedback may include "Brand X" with respect to the recognition model's prediction of a label "Brand Y" for a Brand X logo in a processed media item (e.g., thus, indicating to the recognition model that its prediction was not accurate as well as provide the recognition model with the user-provided label for consideration). In another scenario, the user feedback may include moving or resizing the recognition model's boundary box that it assigned to an particular area of a processed media item to another area of the processed media item (e.g., smaller area, another location, etc.), thereby indicating to the recognition model that its prediction was not accurate or not complete as well as provide the recognition model with the user-indicated area for consideration).

Examples Flowcharts

Figure 3:
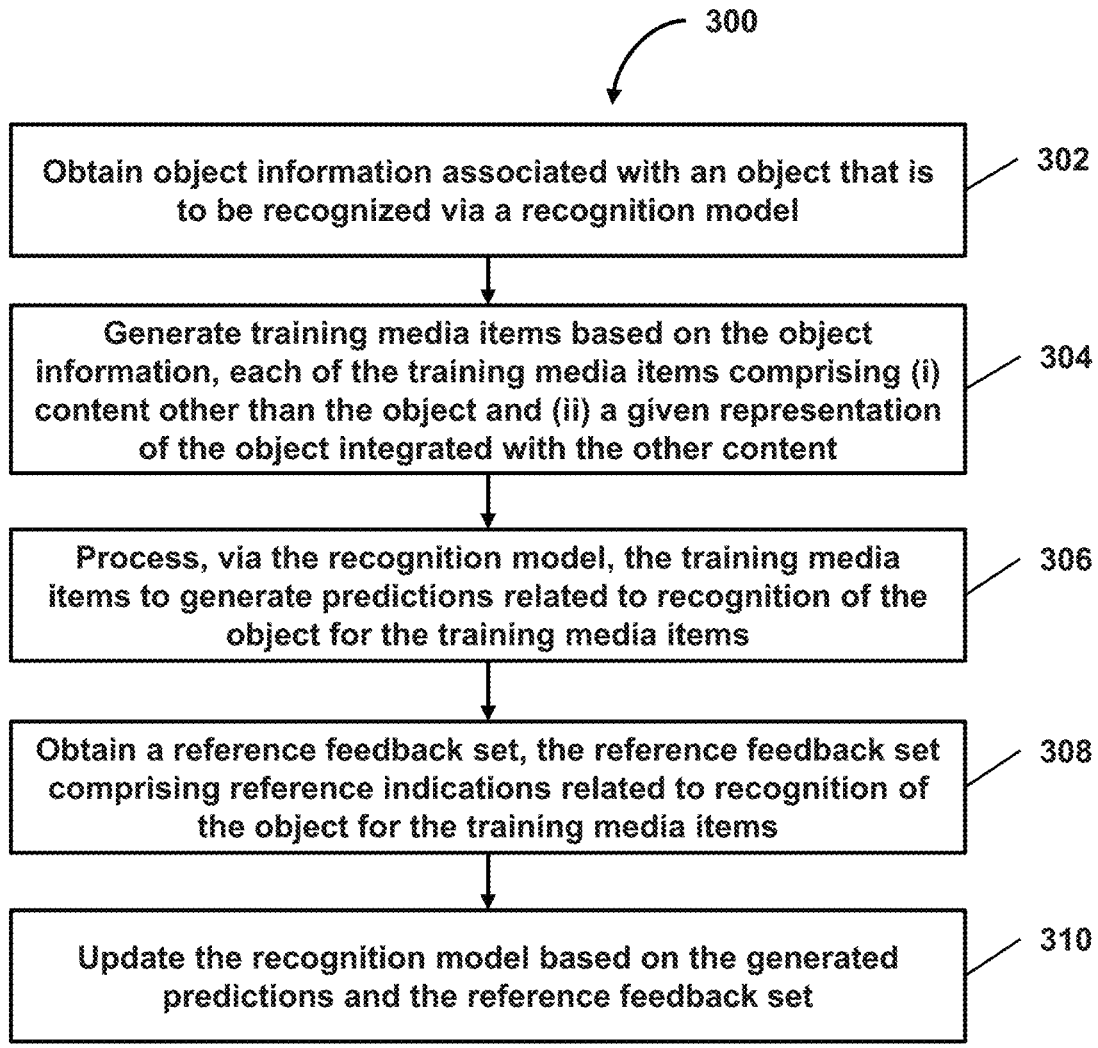
FIG. 3 shows a flowchart of a method of facilitating object recognition training of a recognition model via a media item training set generated based on one or more objects, in accordance with one or more embodiments.
Figure 4:
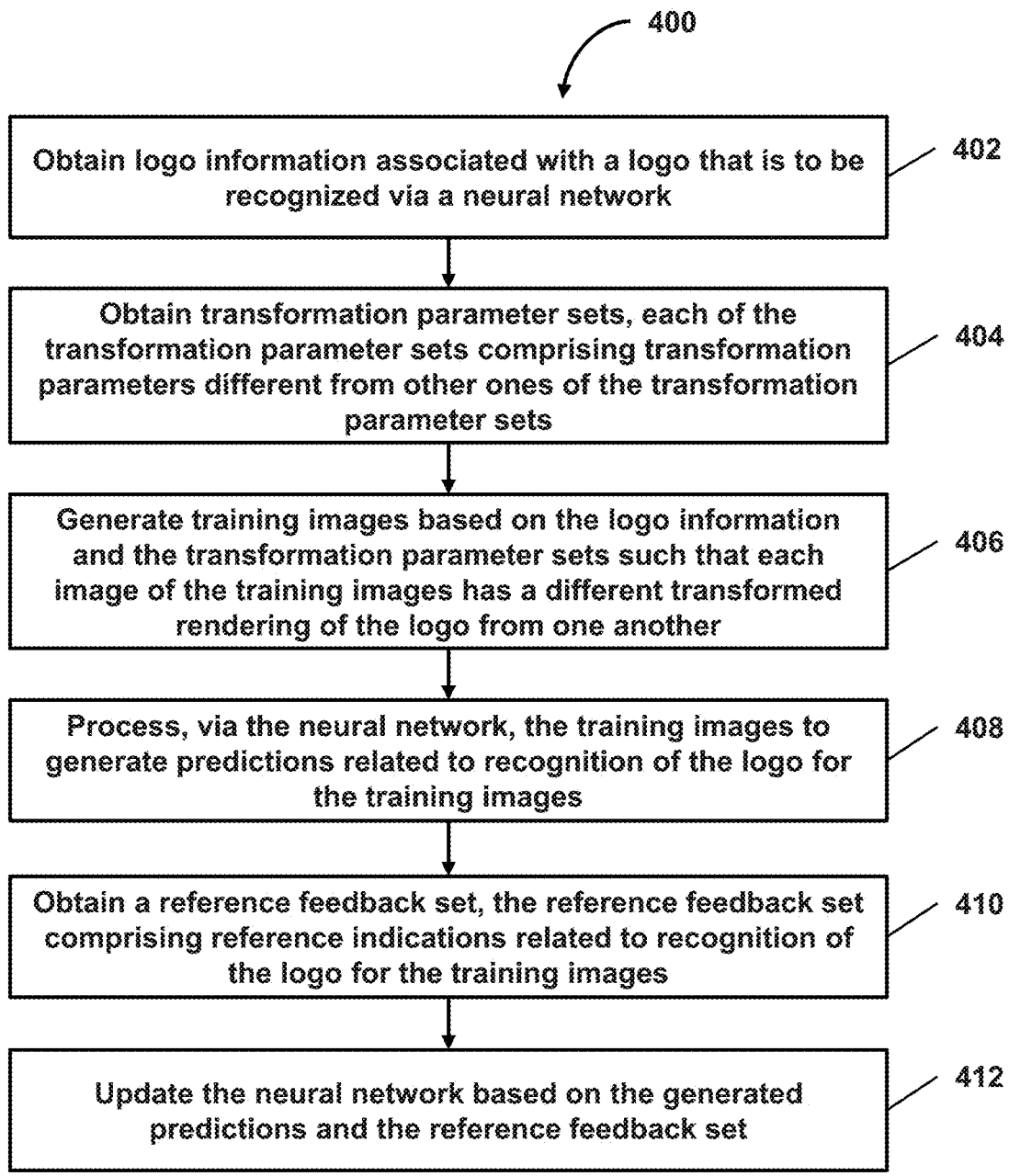
FIG. 4 shows a flowchart of a method of facilitating logo recognition training of a neural network via an image training set generated based on one or more logos, in accordance with one or more embodiments.

FIGS. 3 and 4 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 3 shows a flowchart of a method 300 of facilitating object recognition training of a recognition model via a media item training set generated based on one or more objects, in accordance with one or more embodiments. In an operation 302, object information associated with an object may be obtained. As an example, the object may include a logo or other graphic, a person, an animal (e.g., non-human animal), a plant, a physical item, a fictional character or object, or other object that is to be recognized via a recognition model (e.g., a neural network or other recognition model). The object information may include a data file or other data structure having data representing a representation of the object (e.g., a rendering of the object or other representation of the object), a data file or other data structure having data identifying a reference to the representation of the object (e.g., a link or other pointer to the representation of the object), or other information. Operation 302 may be performed by an item generation subsystem that is the same as or similar to item generation subsystem 112, in accordance with one or more embodiments.

In an operation 304, training media items may be generated based on the object information. The training media items may include audio, images, videos, or other media items (e.g., other media items representing one or more aspects of the object). As an example, the training media items may be generated such that each of the training media items comprises (i) content other than the object, (ii) a given representation of the object integrated with the other content, or (iii) other information. In one use case, the training media items may be generated such that each of the training media items are different from one another in appearance, computational resource size (e.g., different file sizes due to different compression levels applied or other techniques), or other aspects. In another use case, the training media items may be generated such that at least one of the training media items has a different transformed representation of the object from at least one other one of the training media items. Operation 304 may be performed by an item generation subsystem that is the same as or similar to item generation subsystem 112, in accordance with one or more embodiments.

In an operation 306, the training media items may be processed via the recognition model to generate predictions (related to recognition of the object for the training media items). As an example, the generated predictions may include labels of one or more objects respectively predicted to be in the training media items (e.g., class labels or other labels describing the predicted objects), indications of predicted locations of the predicted objects (e.g., heat or other maps, boundary boxes or other structures, etc., indicating the predicted locations), or other predictions. Operation 306 may be performed by a model training subsystem (e.g., via the recognition model) that is the same as or similar to model training subsystem 114, in accordance with one or more embodiments.

In an operation 308, a reference feedback set may be obtained. As an example, the reference feedback set may include reference indications (related to recognition of the object for the training media items). The reference indications may include (i) one or more reference labels describing the object to be recognized respectively in one or more of the training media items, reference indications of locations of the object to be recognized respectively in the training media items, or other desired outputs for use as a reference (ii) accuracy or completeness indications with respect to the recognition model's predicted labels, predicted location indications, or other predictions (e.g., whether a given prediction is accurate, how accurate or complete a given prediction is, etc.), or (iii) other indications for use as a reference. In one use case, the reference outputs may be provided as input to the recognition model (e.g., prior to, simultaneously with, or subsequent to providing the training media items to the recognition model), which the recognition model may utilize to determine whether its predictions are accurate, determine the level of accuracy or completeness with respect to each prediction, or other make other determinations. Such determinations may be utilized by the recognition model to improve the accuracy or completeness of its object recognition capabilities. Operation 308 may be performed by a feedback subsystem that is the same as or similar to feedback subsystem 116, in accordance with one or more embodiments.

In an operation 310, the recognition model may be updated based on the generated predictions and the reference feedback set. As an example, where the reference feedback set includes one or more reference labels describing the object to be recognized, reference indications of locations of the object to be recognized respectively in the training media items, or other desired outputs for use as a reference, the reference outputs may be used by the recognition model to determine whether its generated predictions are accurate or the level of accuracy or completeness of its generated predictions (e.g., by comparing one or more aspects of a given generated prediction with its corresponding reference output or via other techniques). In one use case, the recognition model may utilize such determinations to update itself (e.g., in parallel with the recognition model's processing of a given set of training media items to recognize objects in the training media items, after the recognition model's processing of the given set of training media items, etc.). Operation 310 may be performed by a model training subsystem (e.g., via the recognition model) that is the same as or similar to model training subsystem 114, in accordance with one or more embodiments.

FIG. 4 shows a flowchart of a method 400 of facilitating logo recognition training of a neural network via an image training set generated based on one or more logos, in accordance with one or more embodiments. In an operation 402, logo information associated with a logo (that is to be recognized via a neutral network) may be obtained. As an example, the logo information may include a data file or other data structure having data representing a rendering of the logo, a data file or other data structure having data identifying a reference to the rendering of the logo (e.g., a link or other pointer to the logo rendering), or other information. Operation 402 may be performed by an item generation subsystem that is the same as or similar to item generation subsystem 112, in accordance with one or more embodiments.

In an operation 404, transformation parameter sets may be obtained. As an example, the transformation parameter sets may be obtained such that each of the transformation parameter sets includes transformation parameters different from other ones of the transformation parameter sets. In one use case, the transformation parameter sets to be applied to generate training media items (e.g., images, videos, etc.) may be selected by a user (e.g., via user input identifying transformation parameters for one or more of the transformation parameter sets, via user input selecting such transformation parameters from a larger set of transformation parameters, etc.). In another use case, the transformation parameter sets may be obtained by randomly generating the transformation parameter sets (e.g., via random generation of transformation parameters for each of the transformation parameter sets, via random selection of the transformation parameters for each of the transformation parameter sets from a larger set of transformation parameters, etc.). The transformation parameter sets may include sharpening parameters, softening parameters, brightness parameters, contrast parameters, recoloring parameters, blurring effect parameters, camera effect parameters, motion effect parameters, shadow effect parameters, pattern effect parameters, texture effect parameters, rotation parameters, perspective parameters, resizing parameters, compression parameters, deletion parameters, occlusion parameters, or other transformation parameters. Operation 404 may be performed by an item generation subsystem that is the same as or similar to item generation subsystem 112, in accordance with one or more embodiments.

In an operation 406, training images may be generated based on the logo information and the transformation parameter sets. As an example, the training images may be generated such that each of the training images comprises (i) content other than the logo, (ii) a given rendering of the logo integrated with the other content, or (iii) other information. In one use case, the training images may be generated such that each of the training images are different from one another in appearance, computational resource size (e.g., different file sizes due to different compression levels applied or other techniques), or other aspects. In another use case, the training images may be generated such that at least one of the training images has a different transformed rendering of the logo from at least one other one of the training images. Operation 406 may be performed by an item generation subsystem that is the same as or similar to item generation subsystem 112, in accordance with one or more embodiments.

In an operation 408, the training images may be processed via the neural network to generate predictions (related to recognition of the logo for the training images). As an example, the generated predictions may include labels of one or more logos respectively predicted to be in the training images (e.g., class labels or other labels describing the predicted logos), indications of predicted locations of the predicted logos (e.g., heat or other maps, boundary boxes or other structures, etc., indicating the predicted locations), or other predictions. Operation 408 may be performed by a model training subsystem (e.g., via the neural network) that is the same as or similar to model training subsystem 114, in accordance with one or more embodiments.

In an operation 410, a reference feedback set may be obtained. As an example, the reference feedback set may include reference indications (related to recognition of the logo for the training images). The reference indications may include (i) one or more reference labels describing the logo to be recognized respectively in one or more of the training images, reference indications of locations of the logo to be recognized respectively in the training images, or other desired outputs for use as a reference (ii) accuracy or completeness indications with respect to the neural network's predicted labels, predicted location indications, or other predictions (e.g., whether a given prediction is accurate, how accurate or complete a given prediction is, etc.), or (iii) other desired outputs for use as a reference. In one use case, the reference outputs may be provided as input to the neural network (e.g., prior to, simultaneously with, or subsequent to providing the training images to the neural network), which the neural network may utilize to determine whether its predictions are accurate, determine the level of accuracy or completeness with respect to each prediction, or other make other determinations. Such determinations may be utilized by the neural network to improve the accuracy or completeness of its logo recognition capabilities. Operation 410 may be performed by a feedback subsystem that is the same as or similar to feedback subsystem 116, in accordance with one or more embodiments.

In an operation 412, the neural network may be updated based on the generated predictions and the reference feedback set. As an example, where the reference feedback set includes one or more reference labels describing the logo to be recognized, reference indications of locations of the logo to be recognized respectively in the training images, or other desired outputs for use as a reference, the reference outputs may be used by the neural network to determine whether its generated predictions are accurate or the level of accuracy or completeness of its generated predictions (e.g., by comparing one or more aspects of a given generated prediction with its corresponding reference output or via other techniques). In one use case, the neural network may utilize such determinations to update itself (e.g., in parallel with the neural network's processing of a given set of training images to recognize logos in the training images, after the neural network's processing of the given set of training images, etc.). Operation 412 may be performed by a model training subsystem (e.g., via the neural network) that is the same as or similar to model training subsystem 114, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction database(s) 132, which may include object database(s) 134, template content database(s) 136, recognition model database(s) 138, etc., or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining logo information associated with a rendering of a logo that is to be recognized via a neural network; generating at least 1000 images based on the logo information, each of the 1000 images comprising (i) content other than the logo and (ii) a given rendering of the logo integrated with the other content; processing, via the neural network, the 1000 images to generate predictions related to recognition of the logo for the 1000 images; obtaining a reference feedback set, the reference feedback set comprising reference indications related to recognition of the logo for the 1000 images; and updating the neural network based on the generated predictions and the reference feedback set.

2. The method of embodiment 1, wherein the neural network (i) determines similarities or differences between the generated predictions and their corresponding reference indications and (ii) updates the neutral network aspects based on the determined similarities or differences.

3. The method of embodiment 2, wherein the reference indications comprises reference labels describing the logo respectively for at least some of the 1000 images, and the generated predictions comprises predicted labels respectively for at least some of the 1000 images.

4. The method of embodiment 2, wherein the reference indications comprises reference indications of locations of the logo in at least some of the 1000 images, and the generated predictions comprises indications of predicted locations of the logo in at least some of the 1000 images.

5. The method of embodiment 4, wherein the generated location indications comprises one or more maps or boundary structures indicating predicted locations of the logo in at least some of the 1000 images.

6. The method of embodiment 1, further comprising: determining at least 100 locations at which to place a given rendering of the logo on a given image, each of the 100 locations being different from one another, wherein generating the 1000 images comprises generating at least 100 of the 1000 images based on the 100 locations such that each image of the 100 images comprises a given rendering of the logo at different one of the 100 locations.

7. The method of embodiment 1, further comprising: generating at least 100 renderings of the logo such that each of the 100 renderings of the logo has a different size from one another, wherein generating the 1000 images comprises generating at least 100 of the 1000 images such that each image of the 100 images comprises a different one of the 100 renderings of the logo from one another.

8. The method of embodiment 1, further comprising: obtaining at least 100 transformation parameter sets, each of the 100 transformation parameter sets comprising parameters different from all other ones of the 100 transformation parameter sets, wherein generating the 1000 images comprises generating at least 100 of the 1000 images based on the 100 transformation parameter sets by applying a different one of the 100 transformation parameter sets to the rendering of the logo such that each image of the 100 images has a different transformed rendering of the logo from one another.

9. The method of embodiment 8, wherein obtaining the 100 transformation parameter sets comprises randomly generating at least some of the 100 transformation parameter sets by randomly obtaining transformation parameters for each of the randomly-generated transformation parameter sets.

10. The method of embodiment 8, wherein the 100 transformation parameter sets comprises deletion parameters or occlusion parameters, and wherein generating the 100 images comprises generating one or more of the 100 images based on the deletion parameters or the occlusion parameters such that each of the one or more images has a transformed rendering of the logo in which at least of a portion of the rendering of the logo is missing or hidden from view from a viewer perspective.

11. The method of embodiment 8, wherein the 100 transformation parameter sets comprises sharpening parameters, softening parameters, brightness parameters, contrast parameters, or recoloring parameters.

12. The method of embodiment 8, wherein the 100 transformation parameter sets comprises blurring effect parameters, camera effect parameters, motion effect parameters, shadow effect parameters, pattern effect parameters, or texture effect parameters.

13. The method of embodiment 8, wherein the 100 transformation parameter sets comprises rotation parameters, perspective parameters, resizing parameters, or compression parameters.

14. The method of embodiment 1, further comprising: obtaining at least 100 template images from a database, wherein generating the 1000 images comprises, for each template image of the 100 template images, generating at least one of the 1000 images by integrating a given rendering of the logo with the template image.

15. The method of embodiment 14, wherein integrating a given rendering of the logo with the template image comprising perform alpha-blending of a given rendering of the logo with the template image.

16. The method of embodiment 14, wherein integrating a given rendering of the logo with the template image comprising performing multiple insertions of a given rendering of the logo on the template image such that an image generated from the multiple insertions comprise multiple renderings of the logo.

17. A method comprising: obtaining object information associated with a representation of an object that is to be recognized via a recognition model; generating training media items based on the object information, each of the training media items comprising (i) content other than the object and (ii) a given representation of the object integrated with the other content; processing, via the recognition model, the training media items to generate predictions related to recognition of the object for the training media items; obtaining a reference feedback set, the reference feedback set comprising reference indications related to recognition of the object for the training media items; and updating the recognition model based on the generated predictions and the reference feedback set.

18. The method of embodiment 17, wherein the recognition model (i) determines similarities or differences between the generated predictions and their corresponding reference indications and (ii) updates the neutral network aspects based on the determined similarities or differences.

19. The method of embodiment 18, wherein the reference indications comprises reference labels describing the object respectively for at least some of the training media items, and the generated predictions comprises predicted labels respectively for at least some of the training media items.

20. The method of embodiment 18, wherein the reference indications comprises reference indications of locations of the object in at least some of the training media items, and the generated predictions comprises indications of predicted locations of the object in at least some of the training media items.

21. The method of embodiment 20, wherein the generated location indications comprises one or more maps or boundary structures indicating predicted locations of the object in at least some of the training media items.

22. The method of embodiment 17, further comprising: determining locations at which to place a given representation of the object on a given media item, each of the locations being different from one another, wherein generating the training media items comprises generating at least some of the training media items based on the locations such that each media item of the at least some training media items comprises a given representation of the object at different one of the locations.

23. The method of embodiment 17, further comprising: generating representations of the object such that each of the representations of the object has a different size from one another, wherein generating the training media items comprises generating at least some of the training media items such that each media item of the at least some training media items comprises a different one of the representations of the object from one another.

24. The method of embodiment 17, further comprising: obtaining transformation parameter sets, each of the transformation parameter sets comprising parameters different from all other ones of the transformation parameter sets, wherein generating the training media items comprises generating at least some of the training media items based on the transformation parameter sets by applying a different one of the transformation parameter sets to the representation of the object such that each media item of the at least some training media items has a different transformed representation of the object from one another.

25. The method of embodiment 24, wherein obtaining the transformation parameter sets comprises randomly generating at least some of the transformation parameter sets by randomly obtaining transformation parameters for each of the randomly-generated transformation parameter sets.

26. The method of embodiment 24, wherein the transformation parameter sets comprises deletion parameters or occlusion parameters, and wherein generating the at least some training media items comprises generating one or more of the at least some training media items based on the deletion parameters or the occlusion parameters such that each of the one or more training media items has a transformed representation of the object in which at least of a portion of the representation of the object is missing or hidden from view from a viewer perspective.

27. The method of embodiment 24, wherein the transformation parameter sets comprises sharpening parameters, softening parameters, brightness parameters, contrast parameters, or recoloring parameters.

28. The method of embodiment 24, wherein the transformation parameter sets comprises blurring effect parameters, camera effect parameters, motion effect parameters, shadow effect parameters, pattern effect parameters, or texture effect parameters.

29. The method of embodiment 24, wherein the transformation parameter sets comprises rotation parameters, perspective parameters, resizing parameters, or compression parameters.

30. The method of embodiment 17, further comprising: obtaining template media items from a database, wherein generating the training media items comprises, for each template media item of the template media items, generating at least one of the training media items by integrating a given representation of the object with the template media item.

31. The method of embodiment 30, wherein integrating a given representation of the object with the template media item comprising perform alpha-blending of a given representation of the object with the template media item.

32. The method of embodiment 30, wherein integrating a given representation of the object with the template media item comprising performing multiple insertions of a given representation of the object on the template media item such that a media item generated from the multiple insertions comprise multiple representations of the object.

33. A tangible, non-transitory, machine-readable medium storing instructions that when executed by a data processing apparatus cause the data processing apparatus to perform operations comprising those of any of embodiments 1-32.

34. A system, comprising: one or more processors; and memory storing instructions that when executed by the processors cause the processors to effectuate operations comprising those of any of embodiments 1-32.

What is claimed is:

1. A method comprising:
    generating media items based on graphics information associated with a representation of a graphic, each of the media items comprising (i) content other than the graphic and (ii) a given representation of the graphic integrated with the other content;
    processing, via a recognition model, the media items to generate predictions related to recognition of the graphic for the media items, the generated predictions comprising an indication of a predicted location of the graphic in a first media item of the media items;
    causing, via a user interface, presentation of the indication of the predicted location on an area of the first media item;
    obtaining a reference feedback set, the reference feedback set comprising reference indications related to recognition of the graphic for the media items, the reference indications comprising a reference indication corresponding to a user interaction with the indication of the predicted location of the graphic in the first media item that is initiated via the user interface; and
    updating the recognition model based on the reference feedback set such that the recognition model is updated based on the reference indication corresponding to the user interaction with the indication of the predicted location.

2. The method of claim 1, wherein generating the media items comprises generating the first media item such that at least some content other than the graphic appears opaquely over at least a portion of the graphic on the first media item, and
    wherein generating the predictions comprises generating the indication of the predicted location based on the first media item in which the at least some content appears over at least a portion of the graphic.

3. The method of claim 1, wherein obtaining the reference indications comprises obtaining a reference indication corresponding to a user-initiated movement of the indication of the predicted location to another area of the first media item that is initiated via the user interface, and
    wherein updating the recognition model comprises updating the recognition model based on the reference indication corresponding to the user-initiated movement.

4. The method of claim 1, wherein obtaining the reference indications comprises obtaining a reference indication corresponding to a user-initiated resizing of the indication of the predicted location that is initiated via the user interface, and
    wherein updating the recognition model comprises updating the recognition model based on the reference indication corresponding to the user-initiated resizing.

5. The method of claim 1, further comprising:
    determining locations at which to place a given representation of the graphic on a given media item, each of the locations being different from one another,
    wherein generating the media items comprises generating at least some of the media items based on the locations such that each media item of the at least some media items comprises a given representation of the graphic at different one of the locations.

6. The method of claim 1, further comprising:
    generating representations of the graphic such that each of the representations of the graphic has a different size from one another,
    wherein generating the media items comprises generating at least some media items of the media items such that each media item of the at least some media items comprises a different one of the representations of the graphic from one another.

7. The method of claim 1, further comprising:
    obtaining transformation parameter sets, each of the transformation parameter sets comprising parameters different from all other ones of the transformation parameter sets,
    wherein generating the media items comprises generating at least some media items of the media items based on the transformation parameter sets by applying a different one of the transformation parameter sets to the representation of the graphic such that each media item of the at least some media items has a different transformed representation of the graphic from one another.

8. The method of claim 7, wherein obtaining the transformation parameter sets comprises randomly generating at least some of the transformation parameter sets by randomly obtaining transformation parameters for each of the randomly-generated transformation parameter sets.

9. The method of claim 7, wherein the transformation parameter sets comprise occlusion parameters, and
    wherein generating the at least some media items comprises generating one or more of the at least some media items based on the occlusion parameters such that each of the one or more media items has a transformed representation of the graphic in which at least of a portion of the representation of the graphic is missing or hidden from view from a viewer perspective.

10. The method of claim 7, wherein the transformation parameter sets comprise blurring effect parameters, camera effect parameters, motion effect parameters, shadow effect parameters, pattern effect parameters, texture effect parameters, sharpening parameters, softening parameters, brightness parameters, contrast parameters, or recoloring parameters.

11. The method of claim 7, wherein the transformation parameter sets comprise compression parameters.

12. The method of claim 1, wherein the recognition model (i) determines similarities or differences between the generated predictions and their corresponding reference indications and (ii) updates one or more aspects of the recognition model based on the determined similarities or differences.

13. The method of claim 1, further comprising:
obtaining template media items from a database,
wherein generating the media items comprises, for each template media item of the template media items, generating at least one of the media items by integrating a given representation of the graphic with the template media item, and
wherein integrating a given representation of the graphic with the template media item comprising performing multiple insertions of a given representation of the graphic on the template media item such that an media item generated from the multiple insertions comprises multiple representations of the graphic.

14. The method of claim 1, wherein the recognition model comprises a neural network, and wherein each of the media items is an image.

15. One or more non-transitory, computer-readable media storing instructions that, when executed by one or more processors, cause operations comprising:
processing, via a recognition model, a first media item of media items to generate an indication of a predicted location of a graphic in the first media item, each of the media items comprising (i) content other than the graphic and (ii) a given representation of the graphic integrated with the other content;
causing, via a user interface, presentation of the indication of the predicted location on an area of the first media item;
obtaining, via the user interface, a reference indication corresponding to a user interaction with the indication of the predicted location in the first media item that is initiated via the user interface; and
updating the recognition model based on the reference indication corresponding to the user interaction with the indication of the predicted location.

16. The media of claim 15, wherein obtaining the reference indication comprises obtaining at least one reference indication corresponding to a user-initiated movement of the indication of the predicted location to another area of the first media item that is initiated via the user interface, and
wherein updating the recognition model comprises updating the recognition model based on the at least one reference indication corresponding to the user-initiated movement.

17. The media of claim 15, wherein obtaining the reference indications comprises obtaining at least one reference indication corresponding to a user-initiated resizing of the indication of the predicted location that is initiated via the user interface, and
wherein updating the recognition model comprises updating the recognition model based on the at least one reference indication corresponding to the user-initiated resizing.

18. The media of claim 15, the operations further comprising:
determining locations at which to place a given representation of the graphic on a given media item, each of the locations being different from one another,
prior to the processing of the media items, generating at least some of the media items based on the locations such that each media item of the at least some media items comprises a given representation of the graphic at different one of the locations.

19. The media of claim 15, wherein the recognition model comprises a neural network, and wherein each of the media items is an image.

20. A system comprising:
one or more processors programmed with computer program instructions that, when executed by the one or more processors, cause operations comprising:
processing, via a recognition model, a first media item of media items to generate an indication of a predicted location of a graphic in the first media item, each of the media items comprising (i) content other than the graphic and (ii) a given representation of the graphic integrated with the other content;
causing, via a user interface, presentation of the indication of the predicted location on an area of the first media item;
obtaining, via the user interface, a reference indication corresponding to a user interaction with the indication of the predicted location in the first media item that is initiated via the user interface; and
updating the recognition model based on the reference indication corresponding to the user interaction with the indication of the predicted location.

* * * * *